US010783377B2

(12) United States Patent
Katti et al.

(10) Patent No.: US 10,783,377 B2
(45) Date of Patent: Sep. 22, 2020

(54) VISUALLY SIMILAR SCENE RETRIEVAL USING COORDINATE DATA

(71) Applicant: SAP SE, Walldorf (DE)

(72) Inventors: Anoop Raveendra Katti, Berlin (DE); Shachar Klaiman, Heidelberg (DE); Marius Lehne, Berlin (DE); Sebastian Brarda, Berlin (DE); Johannes Hoehne, Berlin (DE); Matthias Frank, Heidelberg (DE); Lennart Van der Goten, Heidelberg (DE)

(73) Assignee: SAP SE, Walldorf (DE)

( * ) Notice: Subject to any disclaimer, the term of this patent is extended or adjusted under 35 U.S.C. 154(b) by 154 days.

(21) Appl. No.: 16/218,067

(22) Filed: Dec. 12, 2018

(65) Prior Publication Data

US 2020/0193164 A1 Jun. 18, 2020

(51) Int. Cl.
*G06K 9/00* (2006.01)
*G06F 16/783* (2019.01)
*G06N 3/08* (2006.01)

(52) U.S. Cl.
CPC ....... *G06K 9/00744* (2013.01); *G06F 16/783* (2019.01); *G06K 9/00758* (2013.01); *G06N 3/08* (2013.01)

(58) Field of Classification Search
CPC ............ G06K 9/00744; G06K 9/00758; G06F 16/783; G06N 3/08
See application file for complete search history.

(56) References Cited

U.S. PATENT DOCUMENTS

| 9,171,381 | B1* | 10/2015 | Cook | G06F 16/9574 |
| 2002/0036717 | A1* | 3/2002 | Abiko | H04N 19/87 348/700 |
| 2005/0265576 | A1* | 12/2005 | Seong | G06T 1/0028 382/100 |
| 2010/0027077 | A1* | 2/2010 | Wei | G06F 3/0321 358/401 |
| 2013/0194508 | A1* | 8/2013 | Pb | G06F 16/783 348/700 |
| 2017/0061215 | A1* | 3/2017 | Son | H04N 21/47202 |
| 2019/0236371 | A1* | 8/2019 | Boonmee | G06K 9/00765 |

* cited by examiner

*Primary Examiner* — Christopher M Brandt
(74) *Attorney, Agent, or Firm* — Schwegman Lundberg & Woessner, P.A.

(57) ABSTRACT

Aspects of the present disclosure therefore involve systems and methods for identifying a set of visually similar scenes to a target scene selected or otherwise identified by a match analyst. A scene retrieval platform performs operations for: receiving an input that comprises an identification of a scene; retrieving a set of coordinates based on the scene identified by the input, where the set of coordinates identify positions of the entities depicted within the frames; generating a set of vector values based on the coordinates of the entities depicted within each of the frames; concatenating the set of vector values to generate a concatenated vector value that represents the scene; generating a visual representation of the concatenated vector value; and identifying one or more similar scenes to the scene identified by the input based on the visual representation of the concatenated vector value.

20 Claims, 8 Drawing Sheets

VISUALLY SIMILAR SCENE RETRIEVAL USING COORDINATE DATA

TECHNICAL FIELD

Example embodiments of the present application generally relate to data processing and, more particularly, to visual information retrieval systems. More specifically, the invention is directed to a system for the retrieval of stored visual objects based on a target visual object.

BACKGROUND

Improvements in system for the management and retrieval of visual information for various applications are greatly needed. While systems currently in place are adept at collecting and storing visual information, such as videos, in databases, actually searching these databases to identify relevant content can be quite difficult. Furthermore, the results obtained from existing implementations may be highly subjective, and require a significant degree of user intervention and input. As a result, finding a relevant image or video from such databases remains a painstaking and tedious task.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
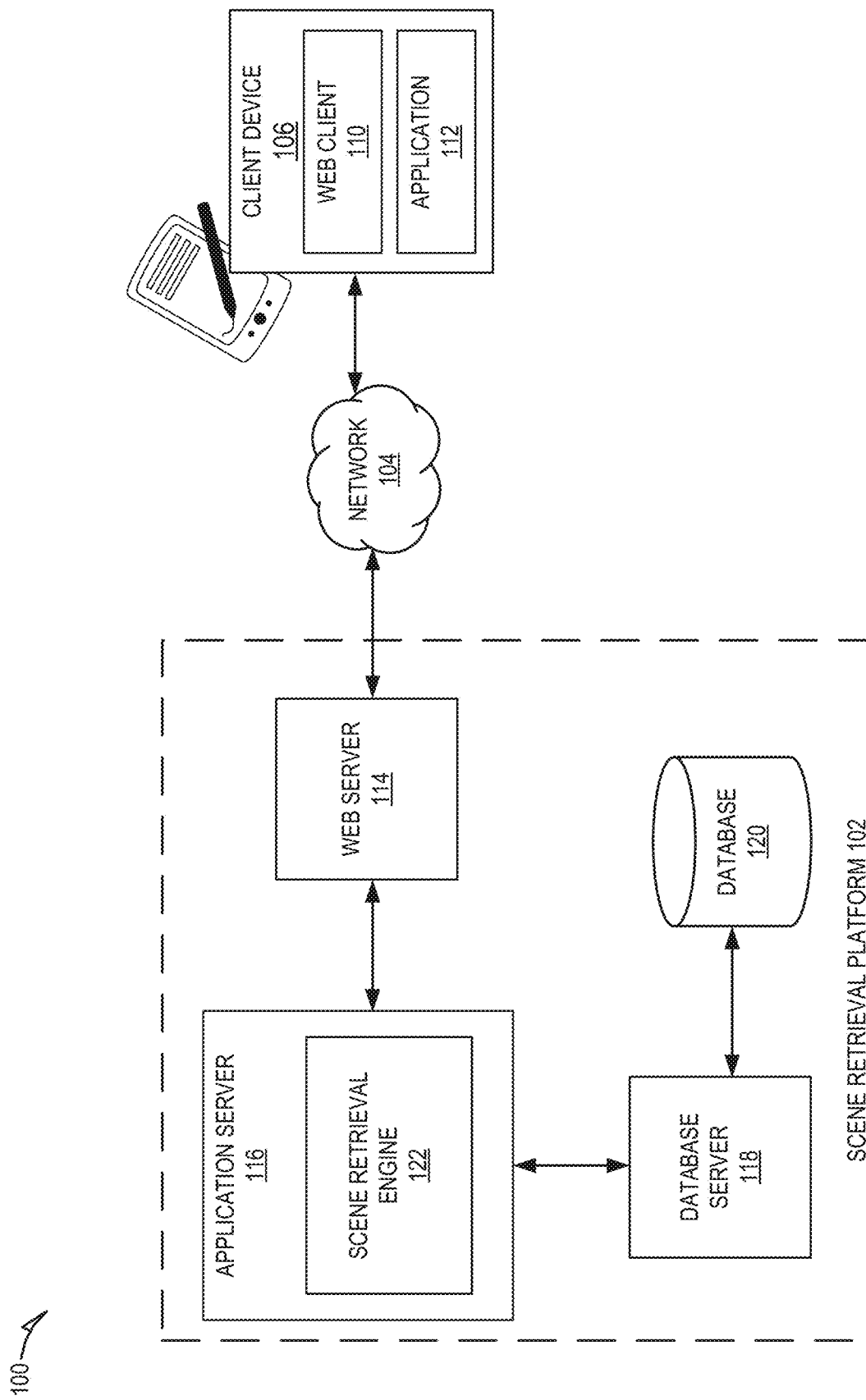
FIG. 1 is an architecture diagram illustrating a scene retrieval platform in an enterprise environment having a client-server architecture configured for exchanging data over a network, according to an example embodiment.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As discussed above, identifying relevant images or videos from databases of visual data that include non-labeled images and videos is an extremely painstaking and slow process for certain analysists of such information. For example, match analysts of certain sporting events have a need to review relevant game footage depicting similar scenes, or scenes similar to an identified scene. Typically, such analysts would either rely heavily on manual inputs and labels made by other analysts in order to identify relevant scenes, or would simply need to sort through thousands of hours of game footage, frame by frame. Such practices are extremely inefficient and burdensome, and as a result hinder the analysis of such footage.

Aspects of the present disclosure therefore involve systems and methods for identifying one or more visually similar scenes to a target scene selected or otherwise identified by a match analyst (i.e., a user). In example embodiments, a scene retrieval platform performs operations for: receiving an input that comprises an identification of a "target scene," where a scene, or target scene, may be defined as a sequence of timestamped frames, and wherein the frames each depict positions of an entity or entities depicted within the frames; retrieving or otherwise accessing a set of coordinates that correspond to each frame within the scene based on the scene identified by the input, where the set of coordinates identify positions of the entity or entities depicted within the frames; generating a frame representation of each frame of the scene; generating a set of vector representations based on the frame representations; concatenating the set of vector representations to generate a concatenated vector that represents the totality of the scene (i.e., represents movements of the entity or entities within the scene); and identifying one or more similar scenes to the scene identified by the input based on the concatenated vector.

Through this approach, the scene retrieval platform is able to receive an input that identifies a scene from a match analyst, and in response retrieve one or more visually similar scenes from a database of matches (e.g., videos of games). A "scene" may be selected or identified based on a user input that includes: an identification of a game in which the scene occurred, based on a naming convention applied within a database of videos; a timestamp indicating a start point of the scene in the game; and a duration that defines a length of the scene, and therefore defines a sequence of frames that define the scene. For example, a scene may be identified by an input such as: "Game 1, 01:23:45, 00:08:00 seconds."

Responsive to receiving the identification of the scene based on the user input, the scene retrieval platform accesses a database to retrieve a set of coordinates that indicate positions of an entity or set of entities within each frame of the scene identified by the input. The coordinates may include corresponding timestamps that identify the positions of the entity or set of entities within each frame at a given time. In some embodiments, the coordinates of the entities depicted in the frames may be represented by one or more coordinate channels. For example, in the context of a sporting event, the coordinate channels may comprise a first channel depicting coordinates of a first team (e.g., Team A), a second channel depicting coordinates of a second team (e.g., Team B), and a third channel depicting coordinates of an object of relevance to the game (e.g., a ball, puck, shuttlecock). Thus, a scene may be formally written as:

$s=[(pos\_A1t1, pos\_A2t1, \ldots pos\_B1t1, pos\_ballt1,$
$\quad height\_ballt1), (pos\_A1t2, pos\_A2t2, \ldots$
$\quad pos\_B1t2, pos\_B2t2, \ldots pos\_ballt2, height\_$
$\quad ballt2), \ldots ],$ As seen above, "pos_Xitj=(x, y)" is the (x, y) coordinate of player "i" from team "X," at time stamp "j," and "pos_balltj=(x, y)" is the position of an object, such as a ball, at time step "j." Given an identification of such a scene, the scene retrieval platform retrieves a set of the most similar scenes based on a vector space, in which vector representations of visually similar scenes are depicted similarly, and near one another within the vector space.

In such embodiments, to build embedding vectors for each time step in a vector space, the scene retrieval platform trains a neural network using unsupervised learning techniques to identify scenes based on vector representations of scenes, by feeding the neural network non-labeled training data that comprises timestamped coordinate data that corresponds with individual frames of the video data. For example, the timestamped coordinate data may define positions of players and a ball in a frame of a video that depicts a sporting event (e.g., a soccer game).

In some embodiments, the scene retrieval platform applies proxy loss to train the neural network such that sequential and adjacent frames (based on timestamps of the frames from the videos) are deemed to be "more similar" than non-sequential and non-adjacent frames. Thus, after several passes through the training database, the neural network converges to the desired property of mapping similar frames to nearby vectors in a vector space. The frames may therefore be represented as points within the vector space, wherein a position of each point within the vector space is based on a corresponding vector representation.

For example, where a scene is represented as a sequence of timestamped frames, the scene retrieval platform generates a frame representation for each timestamped frame, and then feeds the frame representations of the timestamped frames to the trained neural network. Responsive to receiving the frame representations, the trained neural network transforms the frame representations into an embedding vector (e.g., a vector representation). The vector representations of the frame representations may then be concatenated into a "scene vector," wherein the scene vector comprises a vector representation of the scene. Using the vector representation of the scene, a similarity score may be determined for all scenes of equal length to the scene (based on the vector representation of the scene). The scenes of equal length may then be ranked based on the similarity scores, and presented to a user within a graphical user interface.

According to certain example embodiments, the frame representation of a scene may be based on a set of coordinate channels that each define locations, as well as an altitude, of certain entities depicted in the frames of a scene. For example, three distinct coordinate channels may define positions of players from a first team, positions of players from a second team, and positions and altitudes of the ball within each frame. A distance transform may be applied to the three coordinate channels.

For example, the distance transform may be computed as follows:

$P=[(x1,y1),(x_n,y_n)]$

Where, "P" is a set of points on a grid of dimension (H×W). Then the distance transform at any point p=(x, y) may be computed as:

$dt(p)=1/min\_i(\|p-pi\|)$

Where "i=1, . . . n" and ∥.∥ is the L2-norm.

According to certain embodiments, in order to capture the height of the ball, the distance transform of the ball channel may be adjusted by letting b=(xb, yb) by the (x, y) of the ball on a grid of dimension (H×W) and let zb be the height of the ball. The distance transform at any point p=(x, y) on the grid may then be computed as:

$d(p)=1/\|p-b\|/zb$

Where ∥.∥ is the L2-norm. In such embodiments, the size of the ball may be altered in a visualization of a frame proportionally to the height of the ball, thereby expressing the uncertainty in ball location with respect to the ground. In order to capture the direction and speed of the entities within any given frame (i.e., the ball and the players at any given time step), the current time step is computed by averaging vector representations of a current frame with the vector representations of the two previous (or adjacent) frames.

Responsive to identifying the similar scenes based on the input received from the user, the scene retrieval platform may rank or select a portion of the retrieved similar scenes, and present an identification of the similar scenes to a client device. The scenes may for example be ranked based on similarity to the reference scene identified by the user input, wherein similarity is determined based on how close the vector representations are within the vector space.

In some embodiments, the scene retrieval system may present an identification of a similar scene by displaying a game identifier that corresponds with the scene, along with a timestamp and a duration. In further embodiments, the scene retrieval platform may cause display of a set of thumbnail images at the client device, where each thumbnail image comprises a visual representation of a similar scene.

FIG. 1 is an architecture diagram illustrating a scene retrieval platform 102 in an enterprise environment 100 having a client-server architecture configured for exchanging data over a network 104, according to an example embodiment. To avoid obscuring the inventive subject matter with unnecessary detail, various functional components (e.g., modules and engines) that are not germane to conveying an understanding of the inventive subject matter have been omitted from FIG. 1. However, a skilled artisan will readily recognize that various additional functional components may be supported by the enterprise environment 100 to facilitate additional functionality that is not specifically described herein.

As shown, the enterprise environment 100 includes a scene retrieval platform 102 in communication with a client device 106 over the network 104. The scene retrieval platform 102 and client device 106 may connect to the network 104 through a variety of different mechanisms. For example, in some instances, the scene retrieval platform 102 and client device 106 may connect to the network 104 via a Wireless Fidelity (Wi-Fi, IEEE 802.11x type) connection, a Worldwide interoperability for Microwave Access (Wi-MAX) connection, or another type of wireless data connection. In such an embodiment, the network 104 may include one or more wireless access points coupled to a local area network (LAN), a WAN, the Internet, or other packet-switched data network. In other instances, the connection to the network 104 may be a wired connection, for example an Ethernet link, and the network 104 may be a LAN, a WAN, the Internet, or other packet-switched data network. In further embodiments, the scene retrieval platform 102 may reside at and be executed by the client device 106 itself.

As illustrated in FIG. 1, client device 106 may execute a web client 110 (e.g., a web browser) or an application 112 to access, exchange, modify and exchange data with the scene retrieval platform 102. The application 112 may, for example, be an application specifically designed for interacting with various components of the enterprise environment 100.

Turning specifically to the scene retrieval platform 102, a web server 114 provides the client device 106 with programmatic and web interfaces to an application server 116. The application server 116 may be coupled via the web server 114 to the network 104 using wired or wireless interfaces. The application server 116 is also illustrated in FIG. 1 as being coupled to a database server 118 that facilitates access to a database 120. The database 120, which may include a collection of databases that are external and internal to the enterprise environment 100, is a persistent data storage repository that stores and maintains a number of data records pertaining to aspects and functions of the enterprise environment 100 among other types of information. In some embodiments, the application server 116 may access the database 120 without the need for the database server 118.

The application server 116 may, for example, host one or more applications to provide tools and services to users of the enterprise environment 100. As shown, the application server 116 hosts a scene retrieval engine 122, which may be integrated with any one of the applications hosted by the application server 116. The scene retrieval engine 122 provides functionality to identify and retrieve scenes similar to a scene identified by a user input received from the client device 106. Further details regarding the functional components forming the scene retrieval engine 122 are discussed below with reference to FIG. 4.

Although the scene retrieval engine 122 has been discussed and is illustrated as being an independent service that is integrated as part of the scene retrieval platform 102, it shall be appreciated that, in alternative embodiments, the scene retrieval engine 122 may form part of or be integrated with any other services or applications that may be provided by the enterprise environment 100. Further, the scene retrieval engine 122 may form part of a service that is separate and distinct from the scene retrieval platform 102 and the enterprise environment 100.

While the enterprise environment 100 shown in FIG. 1 employs client-server architecture, the present inventive subject matter is, of course, not limited to such an architecture, and could equally well find application in an event-driven, distributed, or peer-to-peer architecture system, for example. Further, the various functional components of the scene retrieval platform 102 may be implemented as stand-alone systems or software programs, which do not necessarily have networking capabilities. Moreover, it shall be appreciated that although the various functional components of the enterprise environment 100 are discussed in the singular sense, multiple instances of one or more of the various functional components may be employed.

Figure 2:
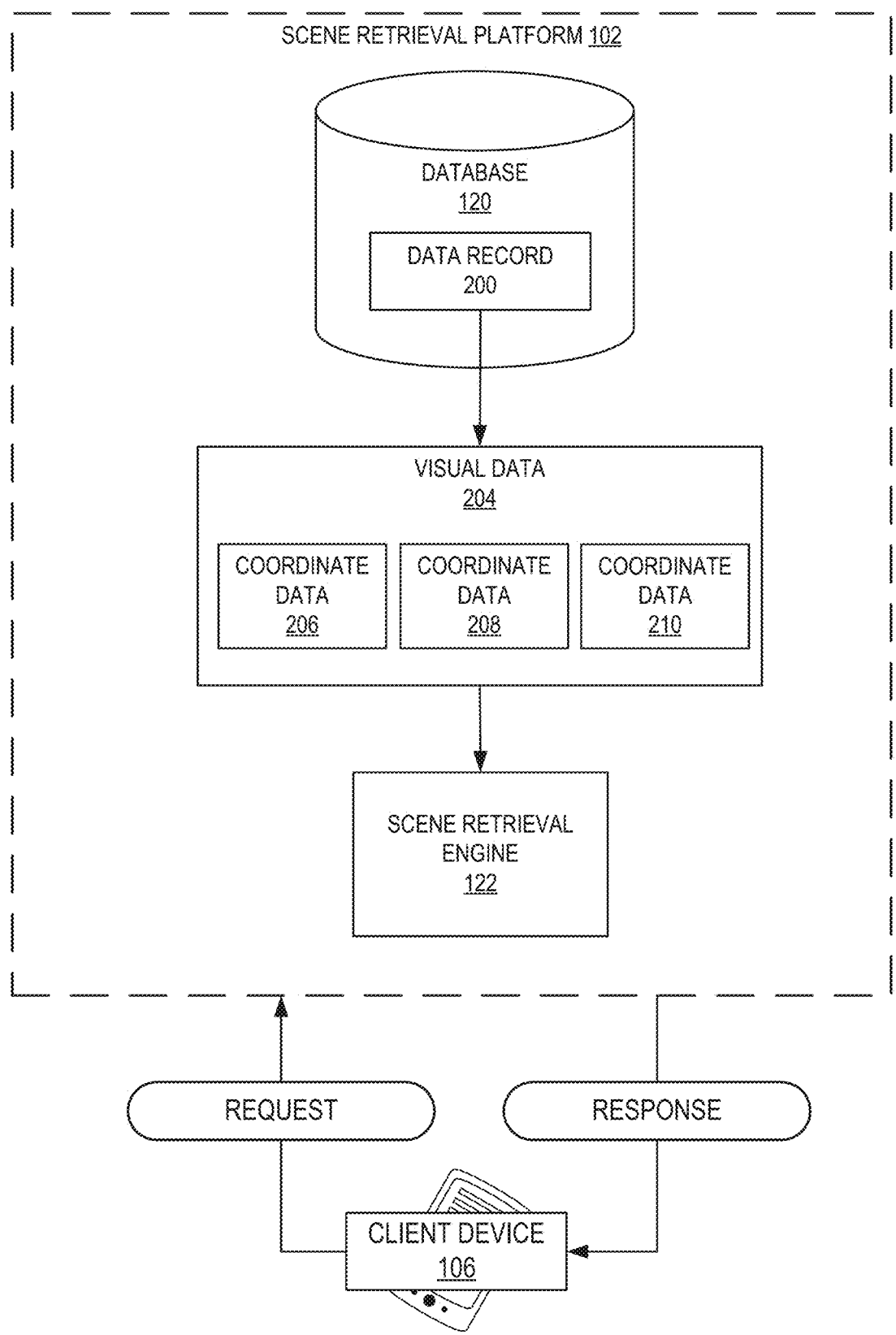
FIG. 2 is a data flow diagram illustrating example exchanges between various functional components of the enterprise environment, according to an example embodiment.

FIG. 2 is a data flow diagram illustrating example exchanges various functional components of the client device 106 (i.e., a remote device) with the scene retrieval platform 102 within the enterprise environment 100, according to an example embodiment. More specifically, FIG. 2 illustrates a request to identify a similar scene from within the database 120, based on a scene identified in a user input received from the client device 106. Upon receiving the request that includes the identification of the scene from the client device 106, the scene retrieval platform 102 accesses the database 120 to retrieve visual data 204 from a data record 200, wherein the data record 200 is identified by the request from the client device 106. For example, the visual data 204 may comprise coordinate data from multiple coordinate data channels (e.g., coordinate data 206, 208, and 210), wherein each channel represents a distinct entity or set of entities within a frame from a video.

The request from the client device 106 may comprise an identification of a scene based on an identification of a game (e.g., an identifier of the data record 200), a timestamp, and a duration. Based on the request, the scene retrieval platform 102 accesses the database 120 to retrieve the visual data 204, wherein the visual data 204 includes a set of timestamped coordinates (e.g., coordinate data 206, 208, and 210) that indicates positions of entities depicted within each frame of the scene identified by the request. The scene retrieval platform 102 generates a frame representation of each frame based on the set of coordinates, and feeds the frame representations to a neural network which transforms the frame representations into one or more vector representations, and then concatenates the vector representations into a single concatenated vector representation of the scene. In some embodiments, each vector representation is averaged with one or more vector representations of adjacent (e.g., preceding) frames.

In such embodiment, the scene retrieval platform 102 retrieves the visual data 204 that comprises the coordinate data 206, 208, and 210 that represents a single time-step of a frame. The coordinate data 206, 208, and 210 undergoes a distance transform to generate a frame representation of the frame. The scene retrieval platform 102 may then crop the frame representation of the frame around a position based on coordinates of one or more entities depicted within the frame (e.g., a ball). In some embodiments, a user of the scene retrieval platform 102 may define or otherwise specify a primary or central entity, and in response, the scene retrieval platform 102 may crop the frame representation around the primary or central entity.

For example, the scene retrieval platform 102 may crop the frames within the scene in order for the vector module 302 to generate a vector representation that is independent of the actual relative location of the entities within a region. For example, the scene retrieval platform 102 may identify a position of an entity with each frame of the scene (e.g., the ball), and crop the frames such that only the entities within a 15 m×15 m square around the ball are factored into the frame representation that is fed into the neural network module 306.

As discussed above, the frame representation of the scene is fed to the scene retrieval engine 122. In some embodiments, a neural network trained based on non-labeled training data may transform the frame representation of the scene into a set of vector representations. The set of vector representations may then be concatenated into a concatenated vector representation by the concatenation module 304, and the concatenated vector representation may then be used to identify one or more similar scenes, wherein the similar scenes have a similar vector representation in the vector space. The one or more similar scenes may then be delivered to the client device 106 in a response from the scene retrieval platform 102.

Figure 3:
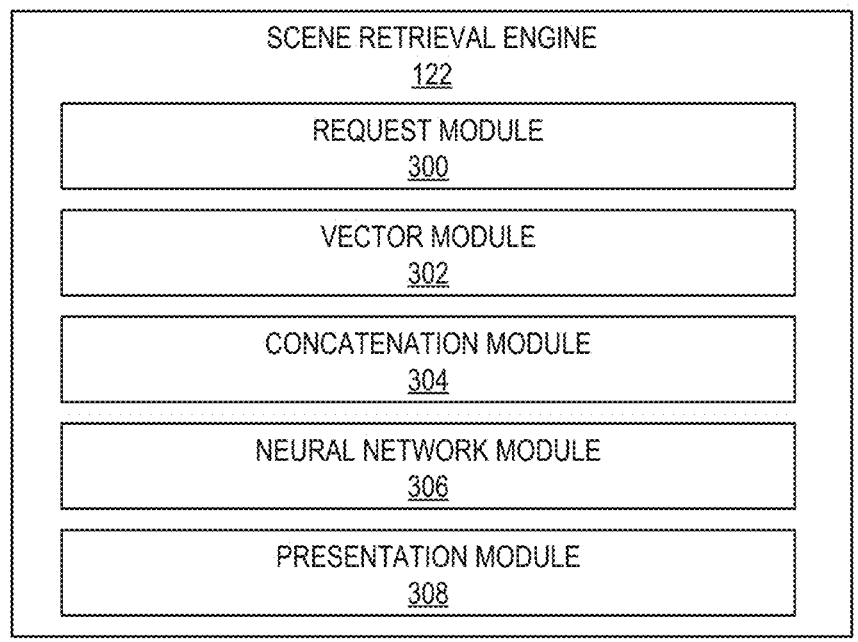
FIG. 3 is a block diagram illustrating various functional components of a scene retrieval engine, which is provided as part of the scene retrieval platform, according to an example embodiment.

FIG. 3 is a block diagram illustrating various functional components of a scene retrieval engine 122, which is provided as part of the scene retrieval platform 102, according to an example embodiment. As is understood by skilled artisans in the relevant computer and Internet-related arts, each component (e.g., a module or engine) illustrated in FIG. 3 represents a set of executable software instructions and the corresponding hardware (e.g., memory and processor) for executing the instructions.

As shown, the scene retrieval engine 122 includes a request module 300, a vector module 302, a concatenation module 304, a neural network module 306, and a presentation module 308, all configured to communicate with each other (e.g., via a bus, shared memory, a switch, or application programming interfaces (APIs)). The various functional components of the scene retrieval engine 122 may reside on a single computer (e.g., a server), or may be distributed across several computers in various arrangements. The various components of the scene retrieval engine 122 may, furthermore, access one or more databases, and each of the various components of the scene retrieval engine 122 may be in communication with one another. Further, while the components of FIG. 3 are discussed in the singular sense, it will be appreciated that in other embodiments multiple instances of the components may be employed.

The request module 300 is responsible for receiving and processing client requests from remote devices (e.g., requests from the client device 106), or from a terminal of the scene retrieval engine 122. For example, the request module 300 may be configured to receive a user request that identifies a frame or scene. For example, the request may comprise an identification of a game, a timestamp, and a duration. The request module 300 receives and processes the request by communicating the request to another module of the scene retrieval engine 122 to trigger appropriate action.

In some embodiments, the vector module 402 may function with the neural network module 306 for the purposes of generating vector representations of frames of scenes identified by the user requests. To this end, the vector module 302 may receive the user request that identifies the frame or scene from the request module 300, and retrieve corresponding sets of coordinates to the frame or frames associated with the identified scene, in order to generate the vector representation of the frames.

In some embodiments, the concatenation module 304 may function with the neural network module 306 for the purpose of generating a vector representation of a scene based on the vector representations of the corresponding frames. For example, responsive to the vector module 402 generating the vector representations of a set of frames that correspond with a scene, the concatenation module 304 may access the vector representations in order to combine the vector representation to generate the concatenated vector value that represents a scene.

The neural network module 306 is configured to perform operations to transform a frame representation into a vector representation, for the purpose of identifying similar scenes based on similarity to the concatenated vector representation, by feeding the concatenated vector representation of the scene generated by the neural network module 306 to the scene retrieval engine 122. For example, in some embodiments, the neural network module 306 may receive or otherwise access a non-labeled training dataset that comprises timestamped frames from video data within a database (e.g., the database 120). The neural network module 306 may thereby be trained such that sequential or adjacent frames from a video are "similar," and therefore must have a similar vector representation, whereas frames that are non-sequential or non-adjacent are less similar.

The presentation module 308 is responsible for presenting responses to requests from client devices (e.g., the client device 106), wherein the responses include a display of the one or more similar scenes. For example, the presentation module 308 may cause display of a presentation of the set of similar scenes at the client device 106, wherein the presentation comprises a display of identifiers of the scenes, or a thumbnail that includes depictions of the set of scenes.

Figure 4:
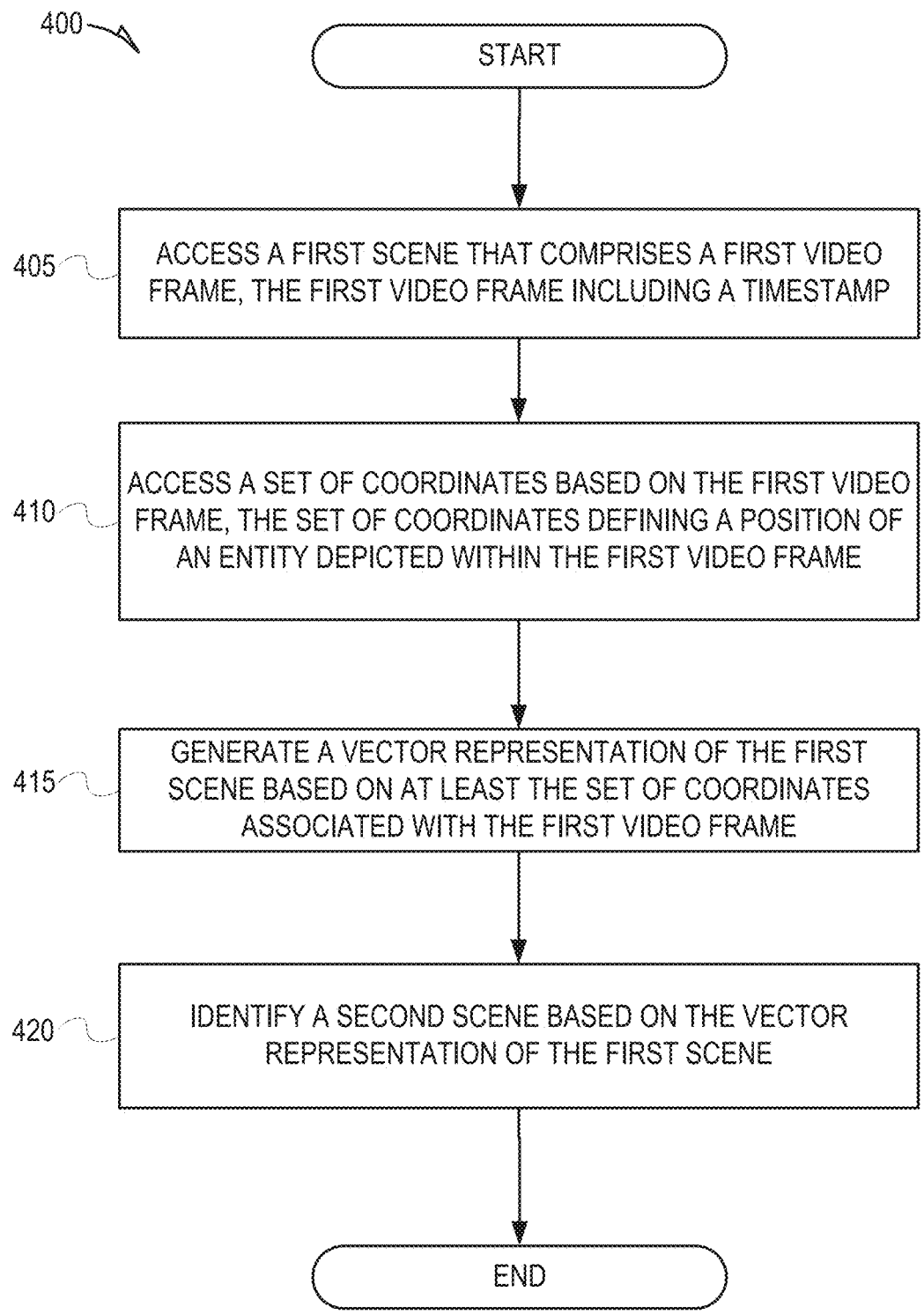
FIG. 4 is a flow chart illustrating a method for identifying similar scenes to a scene identified by a user request, according to an example embodiment.

FIG. 4 is a flow chart illustrating a method 400 for identifying similar scenes to a scene identified by a user request, according to an example embodiment. The method 400 may be embodied in computer-readable instructions for execution by one or more processors such that the steps of the method 400 may be performed in part or in whole by the components of the scene retrieval engine 122, as described in FIG. 3. Accordingly, the method 400 is described below by way of example with reference thereto. However, it shall be appreciated that the method 400 may be deployed on various other hardware configurations and is not intended to be limited to the application server 116 or the scene retrieval engine 122.

At operation 405, the request module 300 accesses a first scene that comprises at least a first video frame. For example, the request module 300 may receive an identification of the first scene from a remote device, such as a client device 106, wherein the identification of the first scene comprises at least a timestamp of the first video frame. In some embodiments, the identification of the first scene may further comprise an identification of a game (or a video file), a timestamp that indicates a starting point of the first scene, and a duration that defines a length of the first scene (and therefore the number of frames within the first scene).

At operation 410, the vector module 302 retrieves a set of coordinates based on the request from the client device 106, wherein the set of coordinates defines a position or positions of an entity or set of entities depicted within the frames that make up the first scene, and include at least the first video frame. For example, the coordinates may identify positions of players and a ball. By referencing timestamps and coordinates of the entities within adjacent frames to the first frame, a vector representation of a single frame may be generated that depicts movements of the entities within the frame.

At operation 415, responsive to retrieving the set of coordinates that correspond with the identified video frame, the vector module 302 generates a frame representation of the first scene based on at least the set of coordinates. In some embodiments, to generate the frame representation of the scene, the vector module 302 retrieves one or more adjacent frames to the first frame (previous frames based on timestamps), and corresponding coordinates based on the previous frames, in order to average the frames and to generate a frame representation that depicts trajectories and velocities of the entities depicted within the frames, based on the averaged frames.

At operation 420, the neural network module 306 receives the frame representation of the scene, and transforms the frame representation of the scene into a vector representation. The scene retrieval engine 122 may identify one or more similar scenes to the first scene, by ranking a plurality of scenes of equal length to the first scene based on their similarity to the vector representation of the scene generated by the neural network module 306. The one or more similar scenes may for example include a second scene.

Figure 5:
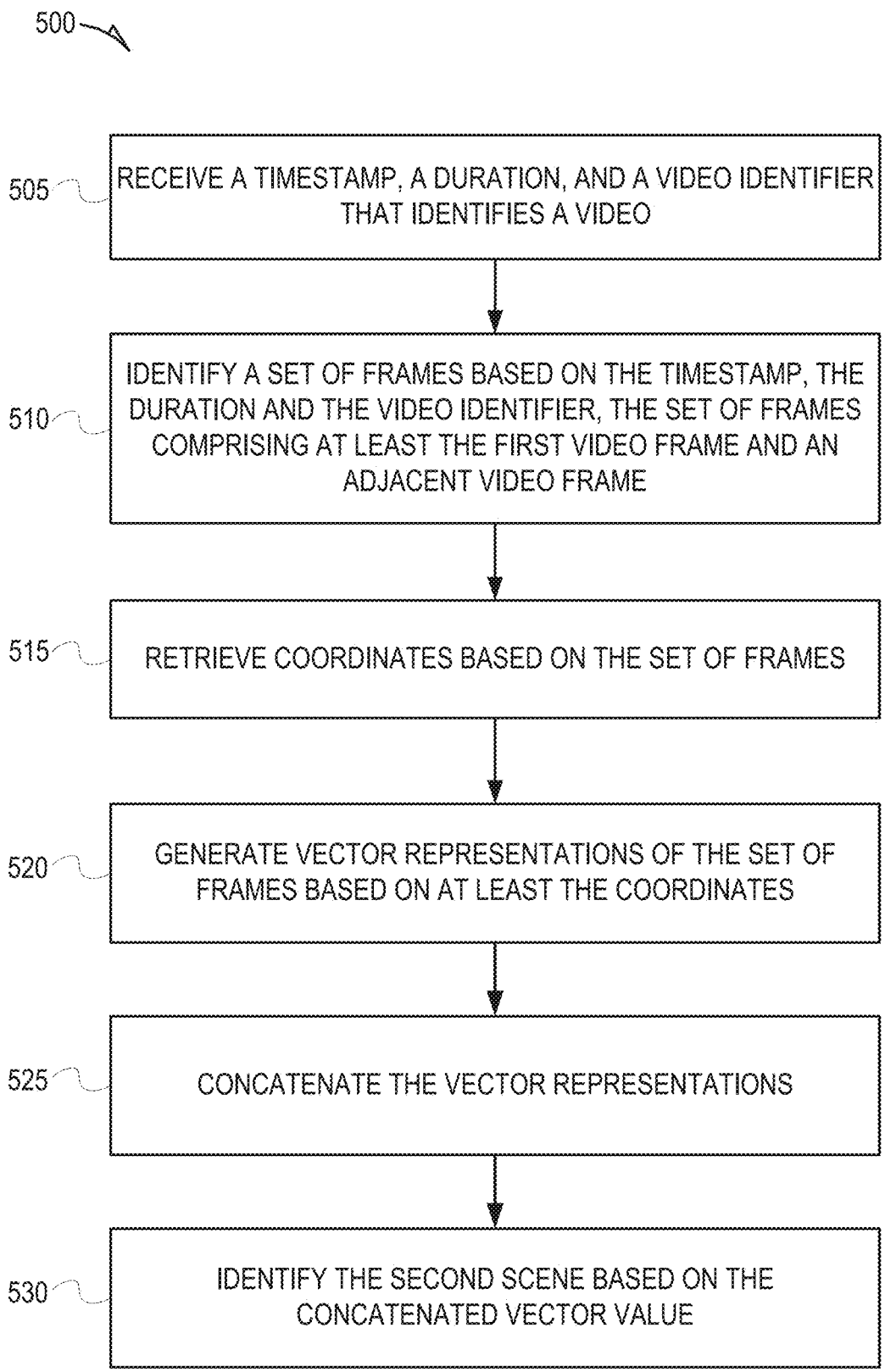
FIG. 5 is a flow chart illustrating a method for identifying similar scenes to a scene identified by a user request, according to an example embodiment.

FIG. 5 is a flow chart illustrating a method 500 for identifying similar scenes to a scene identified by a user request, according to an example embodiment. The method 500 may be embodied in computer-readable instructions for execution by one or more processors such that the steps of the method 500 may be performed in part or in whole by the components of the scene retrieval engine 122, as described in FIG. 3. Accordingly, the method 500 is described below by way of example with reference thereto. However, it shall be appreciated that the method 500 may be deployed on various other hardware configurations and is not intended to be limited to the application server 116 or the scene retrieval engine 122.

At operation 505, the request module 300 receives a user request that includes an identification of a scene that comprises a timestamp, a duration, and a video identifier that identifies a video (e.g., a game). For example, a user of the client device 106 may be a match analyst that wishes to review similar plays to a particular play identified by the match analyst. The match analyst may therefore identify the play by providing the request that includes an identification of the game in which the play occurred, a timestamp that identifies a starting point of the play in the game, and a duration that indicates a length of the play.

Responsive to receiving the request, at operation 510 the request module 300 passes the identification of the scene to the vector module 302. The vector module 302 identifies a set of frames that make up the scene, wherein each of the frames includes timestamp data that indicate a sequence of each frame within the scene. The scene therefore comprises a set of sequential frames, wherein a first frame is immediately before (or after) an adjacent frame.

At operation 515, the vector module 302 retrieves timestamped coordinates from the database 120, wherein the coordinates indicate positions of entities depicted within the frames that make up the scene. For example, the database 120 may comprise a collection of timestamped coordinate data, wherein the coordinate data defines coordinates of entities depicted in frames of a video.

The vector module 302 generates frame representations of the retrieved coordinates and timestamps, and feeds the frame representations of the retrieved coordinates and timestamps to the neural network module 306. At operation 520, the neural network module 306 transforms the frame representations of the coordinates and timestamps into an embedding vector that comprises a set of vector representations that represent each of the frame representations.

At operation 525, the concatenation module 304, working in conjunction with the neural network module 306, concatenates the vector representations of the frames in order to generate a concatenated vector representation of the scene identified by the user request. In some embodiments, the concatenated vector representation may include a frame representation that depicts the vector representation of the scene.

At operation 530, the neural network module 306 identifies one or more similar scenes to the scene identified by the user input based on the concatenated vector representation of the scene. Similar scenes may therefore have a similar vector representation to the concatenated vector value in a vector space. The presentation module 308 may thereby display a presentation of the similar scenes to the client device 106, wherein a ranking or sort order of the presentation of the similar scenes is based on corresponding similarity scores, and wherein the similarity scores is based on how close the vector representations are to one another in vector space.

Figure 6:
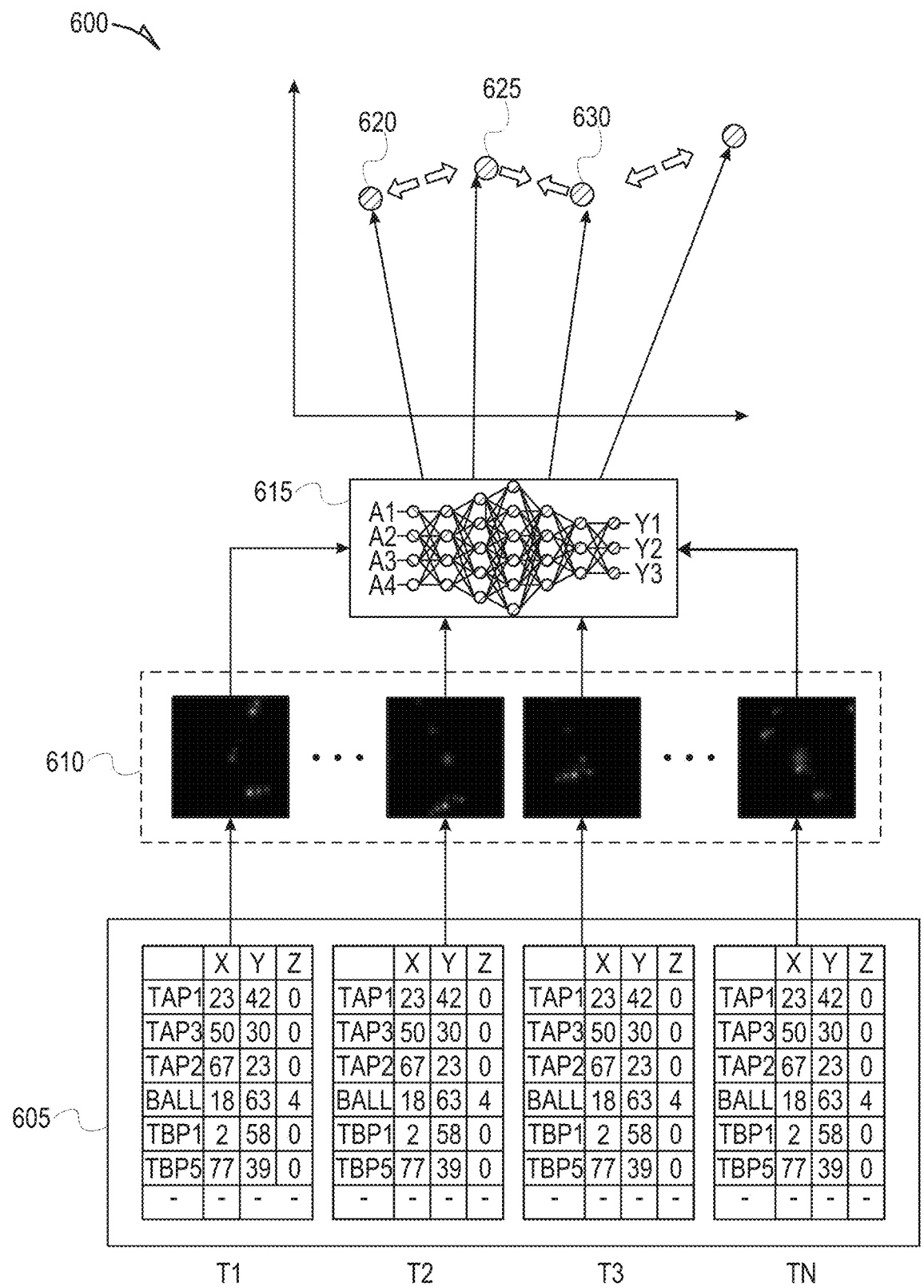
FIG. 6 is a flow diagram depicting a method for training a neural network to detect similarity, according to an example embodiment.

FIG. 6 is a flow diagram 600 depicting a method of training a neural network to detect similarity, according to an example embodiment.

To build the vector space 615 that depicts vector representations of frames and scenes from a database 120, the scene retrieval platform 102 trains a neural network using unsupervised learning techniques by feeding the neural network non-labeled training data that comprises timestamped coordinate data of individual frames of videos. For example, the scene retrieval platform 102 retrieves timestamped coordinate data 605 that corresponds to the video data within the database 120, and generates the frame representations 610 of each frame of the video data based on the method 500 of FIG. 5. Each frame representation among the frame representations 610 is timestamped based on the corresponding coordinate data from among the coordinate data 605.

The frame representations 610 may then be fed to the neural network module 306 of a scene retrieval platform 102. The neural network module 306 transforms the frame representations 610 into a set of vector representations depicted within the vector space 615. Accordingly, the neural network module 306 is trained using the vector representations, such that sequential and adjacent vector representations within the vector space 615 are deemed to be "more similar" than non-sequential and non-adjacent vectors. For example, "similar" vector representations may be depicted as a point within the vector space 615, and that the closer two points are to one another in the vector space 615, the more similar they may be. For example, point 625 and point 630 represent similar vector representations, whereas point 625 and point 630 are less similar.

Figure 7:
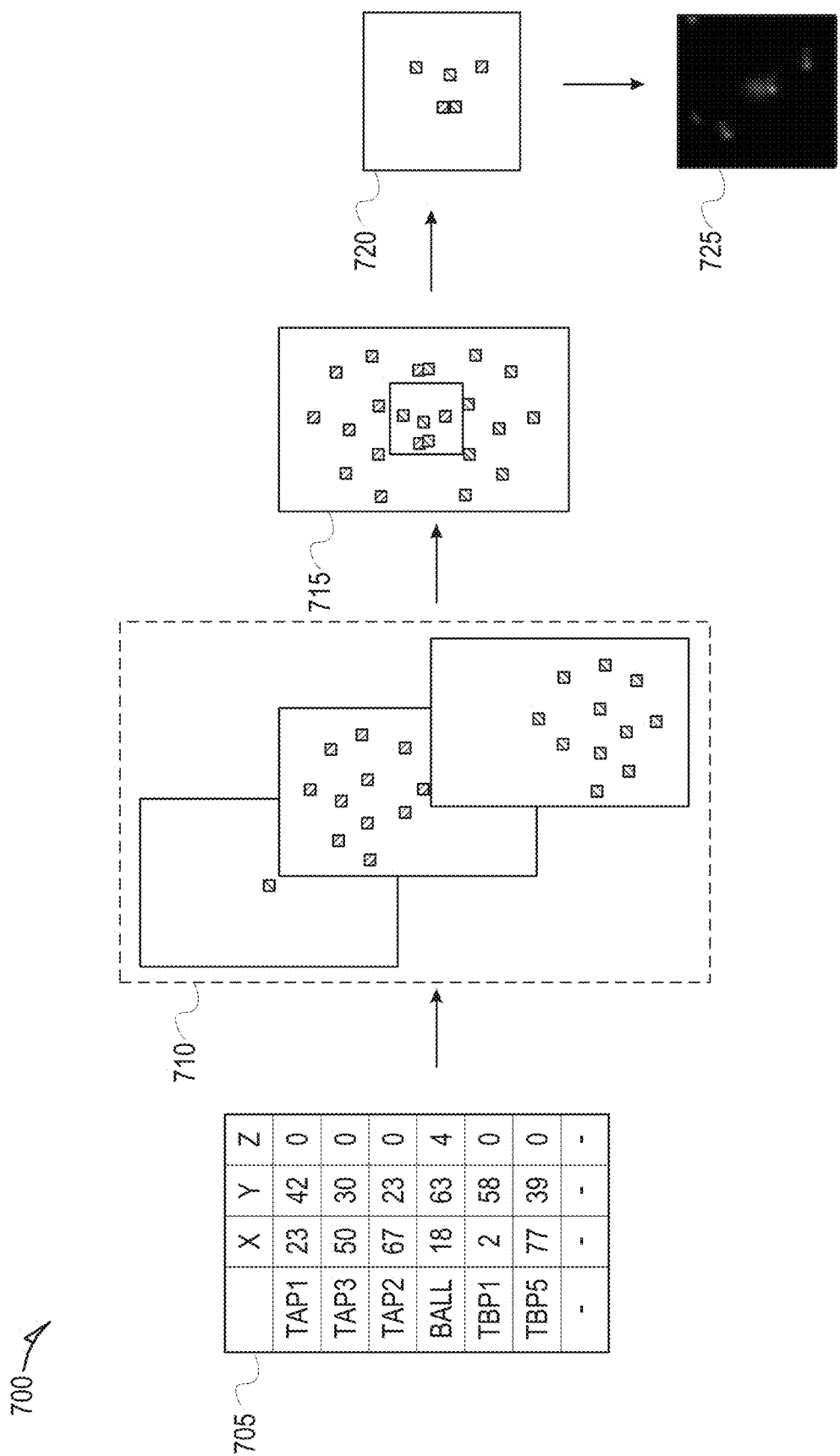
FIG. 7 is a flow diagram depicting a method for generating a vector representation of a scene, according to an example embodiment.

FIG. 7 is a flow diagram 700 depicting a method for generating a vector representation of a scene 725, according to an example embodiment.

As discussed in the method 400 depicted in FIG. 4, the vector module 302 retrieves timestamped coordinates 705 from a database 120. For example, the timestamped coordinates 705 may correspond to a specific scene that comprises a set of video frames. In some embodiments, the vector module 302 may retrieve the set of timestamped coordinates 705 responsive to the request module 300 receiving an identification of a scene associated with the set of timestamped coordinates 705.

The vector module 302 combines multiple distinct channels of coordinates 710 to generate a frame representation 715. In some embodiments, the vector module 302 crops a portion of the frame representation 715. For example, in order to generate a representation of the scene that is independent of the relative location of the entities within a region depicted by the scene, the vector module 715 crops the representation of the space around a point, to generate a cropped representation of a scene 720. For example, the point may be identified based on the coordinates of an entity depicted within the scene (e.g., the ball).

The vector module 302 may then feed the frame representation 715 to the neural network module 306. The neural network module 306 generates the vector representation 725 based on the cropped representation of the scene 720. The vector representation 725 may then be fed into the scene retrieval platform 102 in order to identify similar scenes.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Machine Architecture

Figure 8:
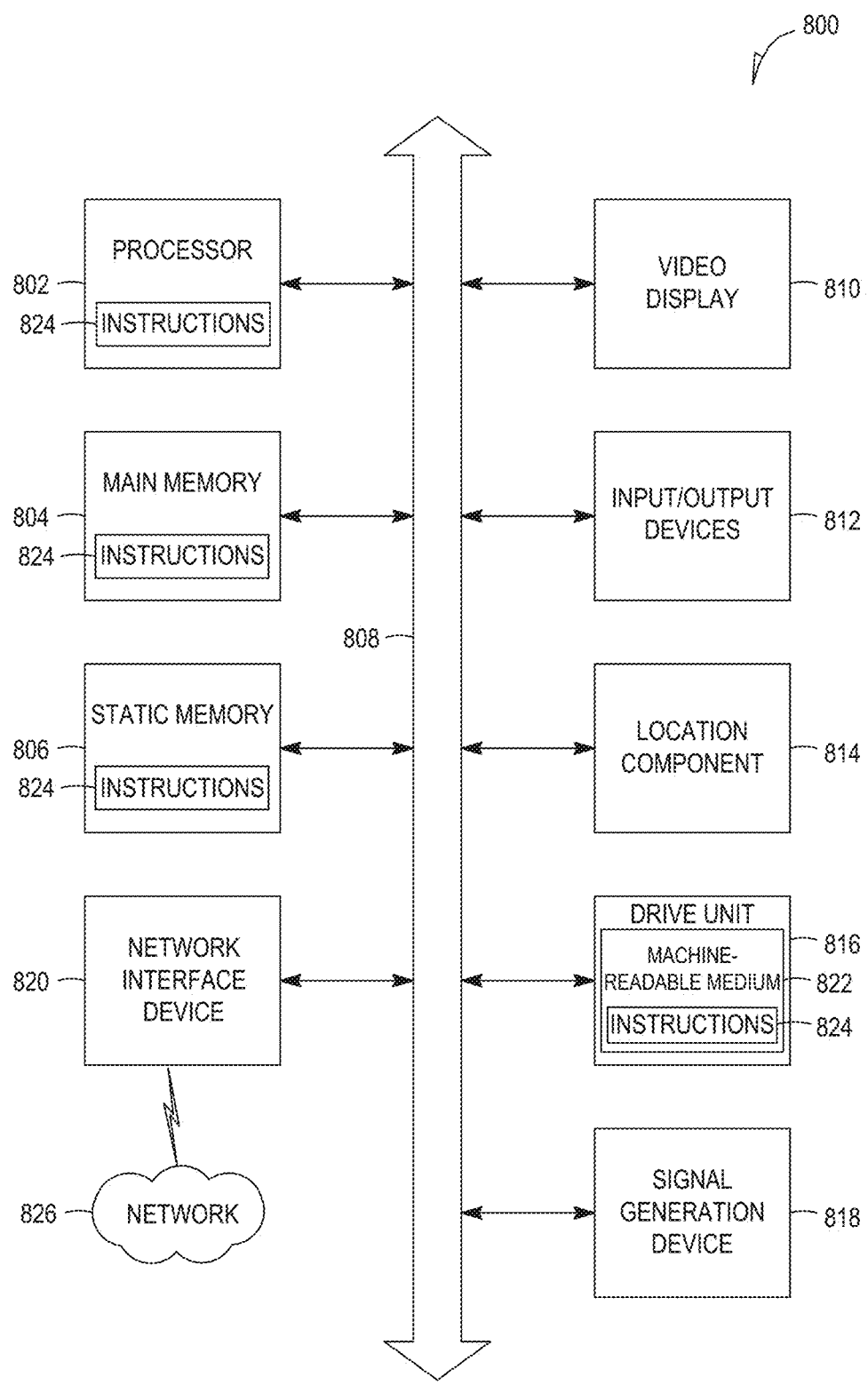
FIG. 8 is a diagrammatic representation of a machine in the example form of a computer system within which a set of instructions for causing the machine to perform any one or more of the methodologies discussed herein may be executed.

FIG. 8 is a diagrammatic representation of a machine in the example form of a computer system 800 within which a set of instructions for causing the machine to perform any one or more of the methodologies discussed herein may be executed. The computer system 800 may correspond to any one of the client devices 106 or 108, the web server 114, or the application server 116, consistent with some embodiments. The computer system 800 may include instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine may, for example, be a personal computer (PC), a PDA, a cellular telephone, a smart phone (e.g., iPhone®), a tablet computer, a web appliance, a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, a video game system console, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display 810 (e.g., a liquid crystal display (LCD) or a cathode ray tube (CRT)). The computer system 800 also includes one or more input/output (I/O) devices 812, a location component 814, a drive unit 816, a signal generation device 818 (e.g., a speaker), and a network interface device 820. The I/O devices 812 may, for example, include a keyboard, a mouse, a keypad, a multi-touch surface (e.g., a touchscreen or track pad), a microphone, a camera, and the like.

The location component 814 may be used for determining a location of the computer system 800. In some embodiments, the location component 814 may correspond to a GPS transceiver that may make use of the network interface device 820 to communicate GPS signals with a GPS satellite. The location component 814 may also be configured to determine a location of the computer system 800 by using an internet protocol (IP) address lookup or by triangulating a position based on nearby mobile communications towers. The location component 814 may be further configured to store a user-defined location in main memory 804 or static memory 806. In some embodiments, a mobile location enabled application may work in conjunction with the location component 814 and the network interface device 820 to transmit the location of the computer system 800 to an application server or third party server for the purpose of identifying the location of a user operating the computer system 800.

In some embodiments, the network interface device 820 may correspond to a transceiver and antenna. The transceiver may be configured to both transmit and receive cellular network signals, wireless data signals, or other types of signals via the antenna, depending on the nature of the computer system 800.

Machine-Readable Medium

The drive unit 816 includes a machine-readable medium 822 on which is stored one or more sets of data structures and instructions 824 (e.g., software) embodying or used by any one or more of the methodologies or functions described herein. The instructions 824 may also reside, completely or at least partially, within the main memory 804, the static memory 806, and/or the processor 802 during execution thereof by the computer system 800, with the main memory 804, the static memory 806, and the processor 802 also constituting machine-readable media.

Consistent with some embodiments, the instructions 824 may relate to the operations of an operating system (OS). Depending on the particular type of the computer system 800, the OS may, for example, be the iOS® operating system, the Android® operating system, a BlackBerry® operating system, the Microsoft® Windows® Phone operating system, Symbian® OS, or webOS®. Further, the instructions 824 may relate to operations performed by applications (commonly known as "apps"), consistent with some embodiments. One example of such an application is a mobile browser application that displays content, such as a web page or a user interface using a browser.

While the machine-readable medium 822 is shown in an example embodiment to be a single medium, the term "machine-readable medium" may include a single medium or multiple media a centralized or distributed database, and/or associated caches and servers) that store the one or more data structures or instructions 824. The term "machine-readable medium" shall also be taken to include any tangible medium that is capable of storing, encoding, or carrying instructions (e.g., instructions 824) for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 824 may further be transmitted or received over a network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, plain old telephone service (POTS) networks, and wireless data networks (e.g., WiFi and WiMax networks), The term "transmission medium" shall be taken to include any intangible medium that is capable of storing, encoding, or carrying the instructions 824 for execution by the machine, and includes digital or analog communications signals or other intangible media to facilitate communication of such software.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein," Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
   accessing, by at least one hardware processor, a first scene that comprises at least a first video frame, the first video frame comprising at least a timestamp;
   accessing, from a database, a set of coordinates based on the first video frame identified by an identifier, the set of coordinates defining at least a position of an entity depicted within the first video frame;
   identifying an adjacent video frame to the first video frame based on the timestamp of the first video frame;
   generating, by the at least one hardware processor, a vector representation of the first scene based on at least the position of the entity within the first video frame, the timestamp associated with the first video frame, and the adjacent video frame; and
   identifying, by the at least one hardware processor, a second scene based on the vector representation of the first scene.

2. The method of claim 1, wherein the accessing the first scene further comprises:
   receiving, from a remote device, an identifier of the first scene that comprises a video identifier, the timestamp of the first video frame, and a duration that defines a length of the scene; and
   wherein the accessing the set of coordinates is based on the video identifier, the timestamp of the first video frame, and the duration that defines the length of the scene.

3. The method of claim 1, wherein the timestamp is a first timestamp, the set of coordinates are a first set of coordinates, the position of the entity is a first position of the entity, the adjacent video frame comprises a second timestamp, and the method further comprises:
   accessing, from the database, a second set of coordinates that define a second position of the entity within the adjacent video frame; and
   generating the vector representation of the first scene based on the first set of coordinates, the first timestamp, the second set of coordinates, and the second timestamp.

4. The method of claim 3, wherein the generating the vector representation of the first scene based on the first set of coordinates, the first timestamp, the second set of coordinates, and the second timestamp includes:
   generating a first vector value based on at least the first timestamp and the first set of coordinates;
   generating a second vector value based on the second timestamp and the second set of coordinates; and
   concatenating the first vector value and the second vector value.

5. The method of claim 1, wherein the method further comprises:
   causing display of a presentation of the second scene at a remote device in response to the identifying, by the at least one hardware processor, the second scene based on the vector representation of the first scene.

6. The method of claim 1, wherein the entity is a first entity, the first video frame comprises a depiction of a plurality of entities that includes the first entity, the set of coordinates define positions of the plurality of entities within the first video frame, and the method further comprises:
   cropping the first video frame based on the position of the entity within the first video frame;
   identifying a portion of the plurality of entities that remain within the cropped first video frame; and wherein the vector representation of the first scene is based on at least the set of coordinates that define the positions of the portion of the plurality of entities that remain within the cropped first video frame.

7. The method of claim 1, wherein the set of coordinates include an altitude value.

8. The method of claim 1, wherein the method further comprises:
generating a visualization of the first scene based on the vector representation of the first scene.

9. A non-transitory machine-readable storage medium comprising instructions that, when executed by one or more processors of a machine, cause the machine to perform operations comprising:
accessing, by at least one hardware processor, a first scene that comprises at least a first video frame, the first video frame comprising at least a timestamp;
accessing, from a database, a set of coordinates based on the first video frame identified by an identifier, the set of coordinates defining at least a position of an entity depicted within the first video frame;
identifying an adjacent video frame to the first video frame based on the timestamp of the first video frame;
generating, by the at least one hardware processor, a vector representation of the first scene based on at least the position of the entity within the first video frame, the timestamp associated with the first video frame, and the adjacent video frame; and
identifying, by the at least one hardware processor, a second scene based on the vector representation of the first scene.

10. The non-transitory machine-readable storage medium of claim 9, wherein the accessing the first scene further comprises:
receiving, from a remote device, an identifier of the first scene that comprises a video identifier, the timestamp of the first video frame, and a duration that defines a length of the scene; and
wherein the accessing the set of coordinates is based on the video identifier, the timestamp of the first video frame, and the duration that defines the length of the scene.

11. The non-transitory machine-readable storage medium of claim 9, wherein the timestamp is a first timestamp, the set of coordinates are a first set of coordinates, the position of the entity is a first position of the entity, the adjacent video frame comprises a second timestamp, and the instructions cause the machine to perform operations further comprising:
accessing, from the database, a second set of coordinates that define a second position of the entity within the adjacent video frame; and
generating the vector representation of the first scene based on the first set of coordinates, the first timestamp, the second set of coordinates, and the second timestamp.

12. The non-transitory machine-readable storage medium of claim 11, wherein the generating the vector representation of the first scene based on the first set of coordinates, the first timestamp, the second set of coordinates, and the second timestamp includes:
generating a first vector value based on at least the first timestamp and the first set of coordinates;
generating a second vector value based on the second timestamp and the second set of coordinates; and
concatenating the first vector value and the second vector value.

13. The non-transitory machine-readable storage medium of claim 9, wherein the instructions cause the machine to perform operations further comprising:
causing display of a presentation of the second scene at a remote device in response to the identifying, by the at least one hardware processor, the second scene based on the vector representation of the first scene.

14. The non-transitory machine-readable storage medium of claim 9, wherein the entity is a first entity, the first video frame comprises a depiction of a plurality of entities that includes the first entity, the set of coordinates define positions of the plurality of entities within the first video frame, and the instructions cause the machine to perform operations further comprising:
cropping the first video frame based on the position of the entity within the first video frame;
identifying a portion of the plurality of entities that remain within the cropped first video frame; and
wherein the vector representation of the first scene is based on at least the set of coordinates that define the positions of the portion of the plurality of entities that remain within the cropped first video frame.

15. The non-transitory machine-readable storage medium of claim 9, wherein the set of coordinates include an altitude value.

16. The non-transitory machine-readable storage medium of claim 9, wherein the instructions cause the machine to perform operations further comprising:
generating a visualization of the first scene based on the vector representation of the first scene.

17. A system comprising:
one or more processors; and
a memory storing instructions that, when executed by at least one processor among the processors, cause the system to perform operations comprising:
accessing, by at least one hardware processor, a first scene that comprises at least a first video frame, the first video frame comprising at least a timestamp;
accessing, from a database, a set of coordinates based on the first video frame identified by an identifier, the set of coordinates defining at least a position of an entity depicted within the first video frame;
identifying an adjacent video frame to the first video frame based on the timestamp of the first video frame;
generating, by the at least one hardware processor, a vector representation of the first scene based on at least the position of the entity within the first video frame, the timestamp associated with the first video frame, and the adjacent video frame; and
identifying, by the at least one hardware processor, a second scene based on the vector representation of the first scene.

18. The system of claim 17, wherein the accessing the first scene further comprises:
receiving, from a remote device, an identifier of the first scene that comprises video identifier, the timestamp of the first video frame, and a duration that defines a length of the scene; and
wherein the accessing the set of coordinates is based on the video identifier, the timestamp of the first video frame, and the duration that defines the length of the scene.

19. The system of claim 17, wherein the timestamp is a first timestamp, the set of coordinates are a first set of coordinates, the position of the entity is a first position of the entity, the adjacent video frame comprises a second timestamp, and the instructions cause the system to perform operations further comprising:

accessing, from the database, a second set of coordinates that define a second position of the entity within the adjacent video frame; and generating the vector representation of the first scene based on the first set of coordinates, the first timestamp, the second set of coordinates, and the second timestamp.

20. The system of claim 19, wherein the generating the vector representation of the first scene based on the first set of coordinates, the first timestamp, the second set of coordinates, and the second timestamp includes:

generating a first vector value based on at least the first timestamp and the first set of coordinates;

generating a second vector value based on the second timestamp and the second set of coordinates; and concatenating the first vector value and the second vector value.

* * * * *